United States Patent [19]
de Sivry et al.

[11] 4,357,517
[45] Nov. 2, 1982

[54] ELECTRON BEAM WELDING WITH BEAM FOCUS CONTROLLED RESPONSIVE TO ABSORBED BEAM POWER

[75] Inventors: Bruno J. M. de Sivry, Paris; Claude R. Carsac, St Leu la Foret; Christian Bonnet, St Gervais, all of France

[73] Assignee: Compagnie Francaise des Petroles, Paris, France

[21] Appl. No.: 186,071

[22] Filed: Sep. 11, 1980

[30] Foreign Application Priority Data

Sep. 14, 1979 [FR] France ................................ 79 22949

[51] Int. Cl.³ .............................................. B23K 15/00
[52] U.S. Cl. .................... 219/121 ES; 219/121 EA; 219/121 ED
[58] Field of Search ................. 219/121 EB, 121 EA, 219/121 EC, 121 ED, 121 EM, 121 ES, 121 EW

[56] References Cited
U.S. PATENT DOCUMENTS

| | | | |
|---|---|---|---|
| 3,291,959 | 12/1966 | Schleich et al. | 219/121 ES |
| 4,021,636 | 5/1977 | von Walter | 219/121 EA |
| 4,127,762 | 11/1978 | Paton et al. | 219/121 EW |

FOREIGN PATENT DOCUMENTS

| | | | |
|---|---|---|---|
| 139102 | 12/1979 | German Democratic Rep. | 219/121 ES |
| 139103 | 12/1979 | German Democratic Rep. | 219/121 EA |
| 143146 | 8/1980 | German Democratic Rep. | 219/121 EW |
| 2026732 | 2/1980 | United Kingdom | 219/121 EA |

OTHER PUBLICATIONS

*Welding Journal;* Feb. 1976; Welding Research Supplement, pp. 525-545; "Electron Beam Welding Spike Suppression Using Feedback Control" by P. Tews et al.

*Primary Examiner*—Gene Z. Rubinson
*Assistant Examiner*—Keith E. George
*Attorney, Agent, or Firm*—Sughrue, Mion, Zinn, Macpeak & Seas

[57] ABSTRACT

In a process for electron beam welding, the electron beam welding gun is controlled to maintain the power absorbed by the pieces being welded substantially constant. In a preferred embodiment the intensity of the electron beam transmitted by the pieces being welded, which corresponds to the power absorbed, is measured, compared with a preset intensity and the difference used to control the focussing current supplied to the gun to maintain the intensity of the transmitted beam constant.

7 Claims, 4 Drawing Figures

ELECTRON BEAM WELDING WITH BEAM FOCUS CONTROLLED RESPONSIVE TO ABSORBED BEAM POWER

BACKGROUND OF THE INVENTION

The present invention relates to electron beam welding.

It is known that the mechanical characteristics, such as the tensile strength, the hardness or the resilience, of a weld, considered in the crude state of solidification, that is to say before any heat treatment, depend on the chemical composition of the molten zone and also on the welding heat cycle to which the weld has been subjected.

As regards the heat cycle, it is a function only of the energy which is actually supplied to the joint between the pieces to be welded, and this applies for a given geometry of joint and when the welding is carried out in a single pass.

The various parameters taken into account for an electron beam welding operation are:
the accelerating voltage of the electron gun (U),
the intensity of the current delivered by the gun ($I_f$),
the focusing current ($I_{foc}$),
the firing distance (d), i.e. the distance between the plane of the focusing coil of the electron beam and the pieces to be welded, and
the welding speed (V).

It is also possible to take into consideration parameters which define possible vibrations of the electron beam.

One of the parameters derived from the above is the firing power of the gun:

$$P_f = U \cdot I$$

It is known that only a fraction $P_{abs}$ of this power will in fact be absorbed by the pieces to be welded; the relative magnitude of $P_{abs}$ essentially depends on the distribution of the power density, which distribution is in turn a function of the exact position of the focusing point of the electron beam, that is to say a function of the value of the current $I_{foc}$. $P_{abs}$ also depends on the distance (d), but the regulation of $P_{abs}$ essentially depends on the parameter $I_{foc}$, which shows that the magnitude of the latter must be considered as predominant.

As regards the electron beam emitted by the gun, it is known that, in addition to the part of this beam corresponding to the power absorbed, it also gives rise to a certain number of derived electron beams, namely:
back-scattered electrons to which the power $P_b$ corresponds,
secondary electrons to which the power $P_s$ corresponds,
electrons of thermal origin, to which the power $P_{th}$ corresponds, and
electrons transmitted through the pieces, in the case of a projecting weld, to which the power $P_{tr}$ corresponds.

The firing power ($P_f$) is thus expressed as follows:
$$P_f = P_{abs} + P_b + P_s + P_{th} + P_{tr}$$

The intensities corresponding in particular to $P_f$, $P_{abs}$ and $P_{tr}$ are obtained by dividing the value of each of these powers by the value, which is always the same, of the accelerating voltage U of the gun.

The value of $P_{abs}$, which can be derived from this equation, governs the heat cycle of the operation for a given welding speed, for a given steel and for a given geometry of the pieces to be welded.

The value of the fraction $P_b$ can be considered as being between 15% and 25% of $P_f$, which leaves the sum of $P_{abs} + P_{tr}$ with a value of between 75% and 85% of the firing power, neglecting, in a first approximation, the other two factors, namely $P_s$ and $P_{th}$, the values of which are low.

It is also known that in order to obtain a good weld in the case of mild or slightly alloyed steels, the power $P_{abs}$ should be held below a certain limit in order to accelerate the heat cycle as much as possible and hence accordingly to reduce the heating-up of the pieces to be joined, outside the welding zone.

It follows that, in the case envisaged, it is appropriate to assign a minimum value to $P_{tr}$, it being necessary for the sum $P_{abs} + P_{tr}$ to remain approximately constant.

Having thus determined the various factors and parameters involved in an electron beam welding operation, attention will now be turned more particularly to the operations of this kind in the case where they are required to maintain the morphological and mechanical characteristics of the welds obtained, and also to exhibit a good reproducibility of these same characteristics, from one operation to the next.

Now, experiment proves that, in certain cases, knowledge of the usual parameters (U, $I_f$, $I_{foc}$, d and V) is insufficient to guarantee and adequate invariability and an adequate reproducibility of the said characteristics, and this is because of the significant amplification effect or multiplication factor existing between the values of the said parameters and factors and the values of the desired characteristics; very small variations in the former cause quite unacceptably large variations in the latter.

Thus, for example, the amplification effect is of the order of 50 between the variations in $I_{foc}$ and the variations in a given mechanical characteristic, namely the HV5 hardness of a steel having the following chemical composition: C 0.14; Mn 1.23; Si 0.22; Ni 0.43; Mo 0.18; B 17 ppm, for a firing power of 22.4 KW, a welding speed of 40 cm/minute, a distance of 600 mm and a thickness of 32 mm for each of the pieces to be welded.

The amplification effect, in the same example, between the variations in $I_{foc}$ and those in $P_{abs}$ is 150.

Using the above example as an illustration, it is found that the amplification effect between the variations in $P_{abs}$ and the variations in the mechanical characteristic envisioned is only 0.33, that is to say that the mechanical characteristic in question varies three times less rapidly than $P_{abs}$.

If a certain variation in the value of $I_{foc}$ gives rise to a substantially greater corresponding variation in the value of the mechanical characteristic in question, it being possible for the latter to be 20 to 50 times greater, for example, the variation in $P_{abs}$ which corresponds thereto is even greater, namely by a factor of about three.

It follows that a certain variation in $P_{abs}$ gives rise to a distinctly smaller corresponding variation in the mechanical characteristic, and this makes it possible to ensure a good stability of the latter, as a function of the said variations in $P_{abs}$, and consequently a reproducibility which can be very reliably guaranteed.

If the variations in $P_{abs}$ are therefore kept within a margin of less than 1%, for example, the corresponding variation in the mechanical characteristic in question will be even better, and this will be virtually equivalent, purely and simply, to keeping the said characteristic at its initial value.

SUMMARY OF THE INVENTION

According to the present invention there is provided a process for regulating electron beam welding of pieces, comprising, during welding, making a measurement of a power which provides information on the power which is actually absorbed in the weld, and, in accordance with said measurement, regulating at least one parameter relating to the means for generating said electron beam so as to maintain said power which is actually absorbed substantially constant.

Thus, in any operation which follows the first, if it is desired to obtain the same value of the mechanical or metallurgical characteristic in question, it is necessary to regulate the various parameters defined above so that they assume the same values as in the first operation, in order to obtain the same value of $P_{abs}$ with the same degree of precision as in the said first operation.

In a preferred embodiment of the invention, $P_{tr}$ is kept constant instead of $P_{abs}$, and this must have substantially the same effect, taking account of the above considerations and especially of the constant relationship between $P_{abs}$ and $P_{tr}$.

The advantage in this case is that $P_{tr}$ is easier to measure than $P_{abs}$.

Experiment has shown that, for good focusing, the value of $P_{tr}$ can reach 40% of $P_f$, which, by difference, leaves a value of the same order for $P_{abs}$.

Advantageously, a control loop is set up and, after having assigned to $P_{tr}$ a preset constant value which is defined in advance, the error signal on which a parameter, for example $I_{foc}$, is caused to depend is fed back into the control loop in the knowledge that the resulting variations in the mechanical characteristic in question will remain within the prescribed limits, which, because these limits are extremely narrow, effectively amounts to saying that this characteristic is kept constant.

It is possible to determine the parameter $I_{foc}$ from voltage measurements proportional to the intensity of the electron beam which has passed through the pieces to be welded, using devices which will be described hereafter.

Further features and advantages of the invention will become apparent from the following description of embodiments thereof, given by way of example only with reference to the accompanying drawings.

DESCRIPTION OF THE PREFERRED EMBODIMENTS

Figure 1:
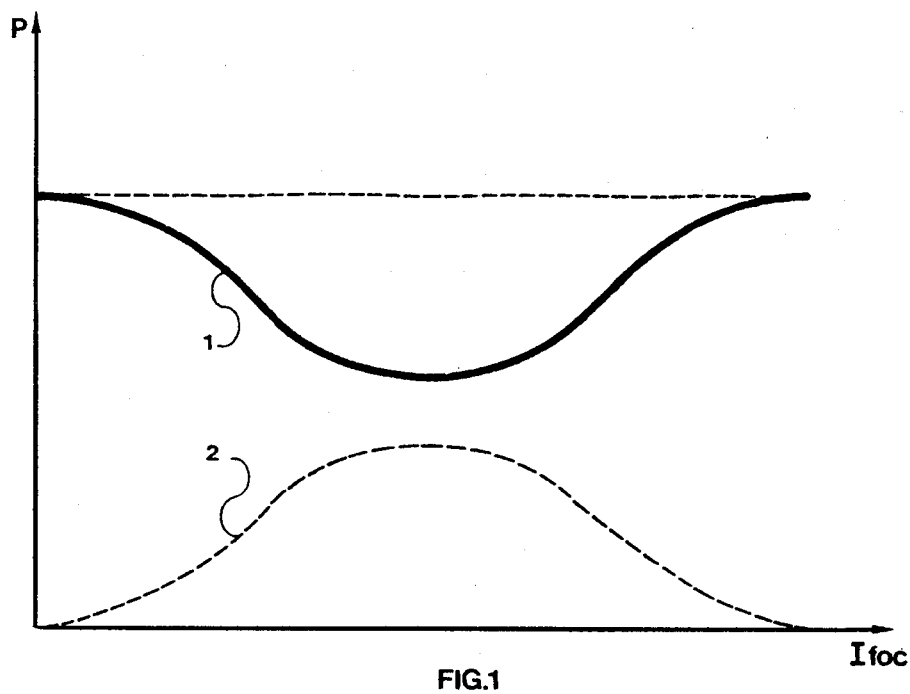
FIG. 1 is a graph showing the variation in $P_{abs}$ and $P_{tr}$ as a function of $I_{foc}$.

FIG. 1 shows the curve 1 of the variation in $P_{abs}$ as a function of $I_{foc}$. This curve has a minimum value. The same Figure shows, on approximately the same scale, the curve 2 of the correlative variations in $P_{tr}$, this curve being symmetrical with the first and consequently having a maximum opposite the minimum in the curve of $P_{abs}$.

In practice, the value of $P_{abs}$ which it is proposed to keep constant is predetermined; the value of $P_{tr}$ deduced from the graph corresponds thereto, for the same value of $I_{foc}$.

Figure 2:
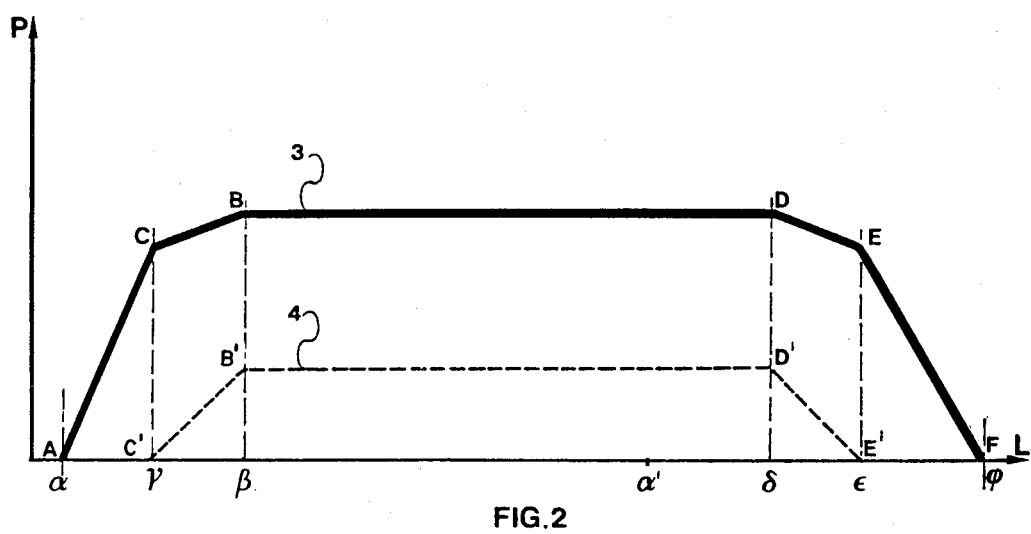
FIG. 2 is a developed graph of the respective values assumed by $P_{abs}$ and $P_{tr}$ during an electron beam welding operation on a linear section of a tube which is to be welded to another identical tube.

The respective developed traces of the absolute values assumed by $P_{abs}$ and $P_{tr}$, as a function of the advance of the electron gun along the welding line, that is to say as a function of time, have been plotted and shown by a solid line 3 and a broken line 4 respectively on the graph of FIG. 2, the speed of advance of the gun being assumed constant; this applies to a welding operation for joining two tubular elements of the same cross-section to one another. The complete revolution of the weld bead thus runs from 0°, corresponding to the abscissa $\alpha$, to 360°, corresponding to the abscissa $\alpha'$, beyond which point the value of $P_{abs}$ extends over an additional length representing the desired overlapping of the bead. There is also an overlapping, of shorter duration, for the curve 4 of $P_{tr}$.

At the constant $\alpha$, at the start of the operation, the powers $P_f$ and $P_{abs}$ are still zero.

As from this instant, $P_f$ starts to assume a certain value and this causes the appearance of $P_{abs}$. The two powers then increase and the graph shows the increase in $P_{abs}$ from A to C, up to a certain value of $P_f$, the ordinate of the point C on the graph corresponding to this value. This instant, designated by $\gamma$, corresponds to the point when the electron beam starts to pass through the pieces to be welded, that is to say to the appearance of a power $P_{tr}$.

The correlative increases in the two powers $P_{abs}$ and $P_{tr}$ can be seen respectively from C to B and C' to B' (instant point $\beta$), the slope of C-B being substantially smaller than that of A-C.

As from the respective points B and B', the powers in question remain at constant values up to D and D' respectively (instant $\delta$).

As from this instant, which marks the point when the period envisaged for overlapping ends, the electron beam starts to fade, by a progressive reduction in $P_f$. At the instant $\epsilon$, it is seen that the electron beam no longer passes through the pieces to be welded.

$P_{abs}$ decreases along D-E, and this also corresponds to the decrease in $P_{tr}$ from D' to E', $P_{tr}$ becoming zero at the point E' by definition.

The fading of $P_{abs}$ takes place from E to F as a consequence of the corresponding decrease in $P_f$.

The slopes of the various segments mentioned are all predetermined.

Figure 3:
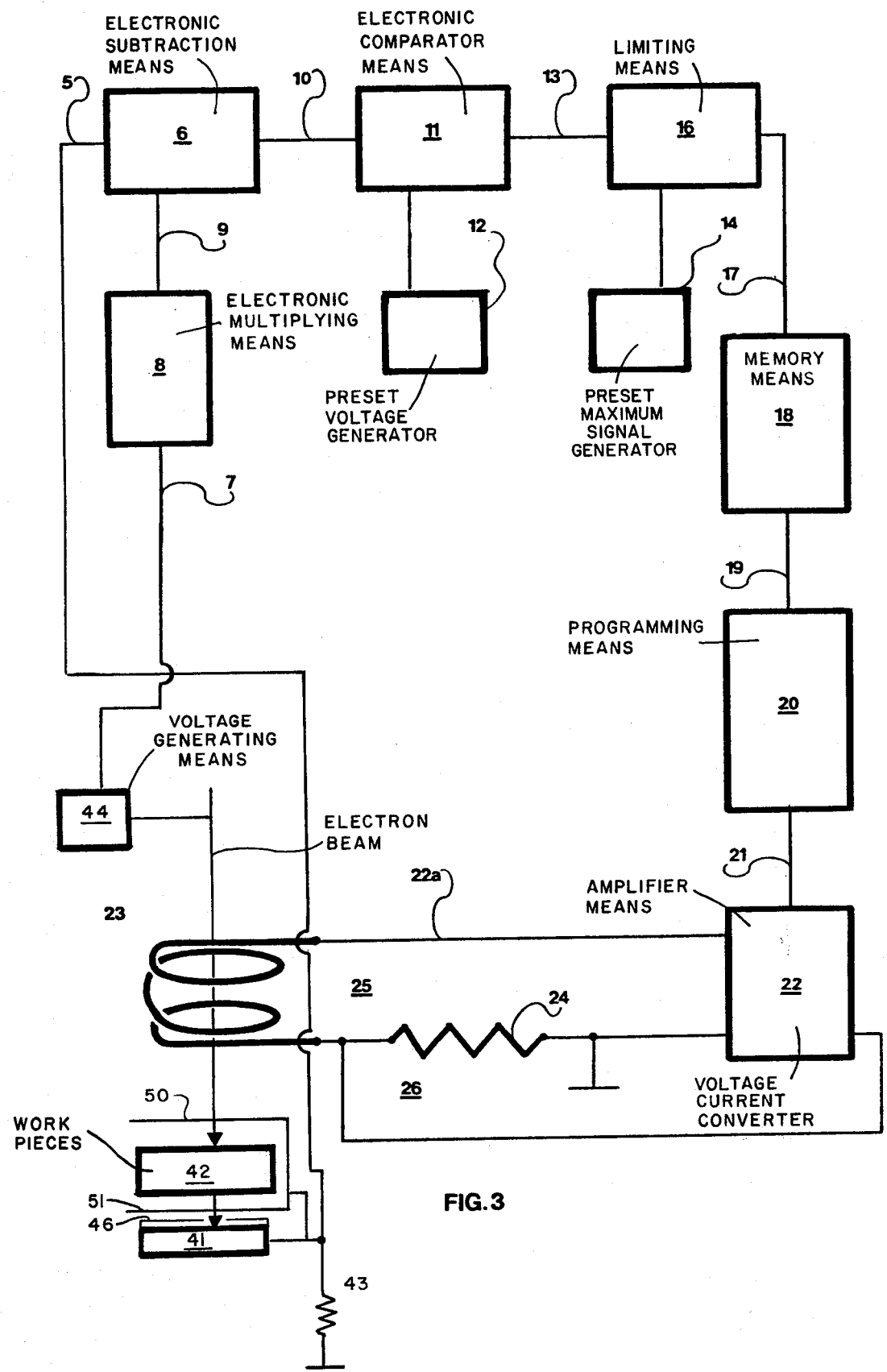
FIG. 3 is the block diagram of part of a device, according to the invention, for regulating $P_{tr}$.

FIG. 3 shows part of a block diagram of a device for use in carrying out a process according to the invention. The factors taken into consideration are the voltages proportional to the intensities of the two powers present, namely $P_f$ and $P_{tr}$.

The voltage 5 proportional to the intensity of the power transmitted, $P_{tr}$, is measured.

This intensity is measured on the path of the electron beam, on which path a collector consisting of a fire shield 41, optionally surrounded by a Faraday cage, in the front face of which an opening is provided for the passage of the transmitted beam, is interposed behind the assembly consisting of the pieces 42 to be joined.

The actual collection takes place via a resistor 43 connected between said shield and earth, it being specified that the very high voltage supply of the device is itself connected to earth by its − pole, its − pole being connected to the cathode of the electron gun in a known manner. The said voltage 5, which is proportional to the intensity measured in this way, is fed into an electronic subtraction means 6, which is also fed with a voltage 9 which is a predetermined fraction of a voltage 7 which is provided by a voltage generating means 10. The voltage 7 is proportional to the intensity of the total flux corresponding to the power $P_f$ of the electron gun, the coefficient of proportionality being the same as for the voltage representing $P_{tr}$, the said fractional voltage 9 being obtained at the output of an electronic multiplying means 8, which is supplied with the voltage 7 proportional to the intensity corresponding to the power $P_f$. As specified above, the said fraction represents about 80% of that which is fed into the multiplying system 8 at 7.

The voltage 10 at the output of the subtraction system 6 corresponds to $P_{abs}$ and is fed into an electronic comparator means 11 which is also supplied with a preset voltage generated by the preset voltage generator 12 corresponding to the required value of $P_{abs}$, the said value being that which it is desired to maintain.

The error signal 13, that is to say the difference between the two voltages 10, 12 fed into the comparator means 11, is fed back into the system for regulating the focusing current $I_{foc}$; the control loop is thus closed and makes it possible to keep $P_{abs}$ at a strictly constant level, which is the desired object.

The diagram of FIG. 3 is completed by a limiting means 16, connected to a preset maximum signal generator 17, which is intended to limit the signal for controlling the regulated parameter, which in this case is the focusing current, to a maximum value. This limitation takes effect, in particular, at the start of a welding operation.

The signal 17 leaving the means 16, which is constant throughout the welding operation up to the points D and D′, is fed into a memory means 18, the purpose of which is to retain, throughout the period during which the electron beam fades, the value of this signal at the precise instant δ at which fading starts. Up to this instant, the input and output signals of the means 18, that is to say 17 and 19 respectively, are equal and constant.

The signal 19 is fed into a programming means 20 whereby the mode of operation, on the one hand, during the initial stage in which the power of the gun increases, and, on the other hand, during the final stage in which this power fades, can be substituted for the control described above and as carried out during the operating mode with a constant firing power $P_f$ of the electron gun. The purpose of this means 20 is thus to determine the slopes of the corresponding operating stages, as a function of the various parameters of the welding, of the positioning of the pieces to be welded, and of time.

The signal 21 leaving the means 20 is fed into an amplifier means 22, which at the same time is a voltage/current converter. The signal 22a leaving the means 22 is in fact the current $I_{foc}$ which is supplied to the focusing coil 23 of the gun, the circuit closing at the means 22 via resistor 24, that end of the resistor connected to the means 22 being grounded.

Loop 26, which also closes at the means 22, is used to measure the actual current $I_{foc}$.

In a modification, it is possible to regulate the Wehnelt voltage of the electron gun in the same manner, instead of acting on $I_{foc}$.

It is also possible to follow an analogous procedure by regulating the power absorbed, $P_{abs}$, at a constant specified value.

Figure 4:
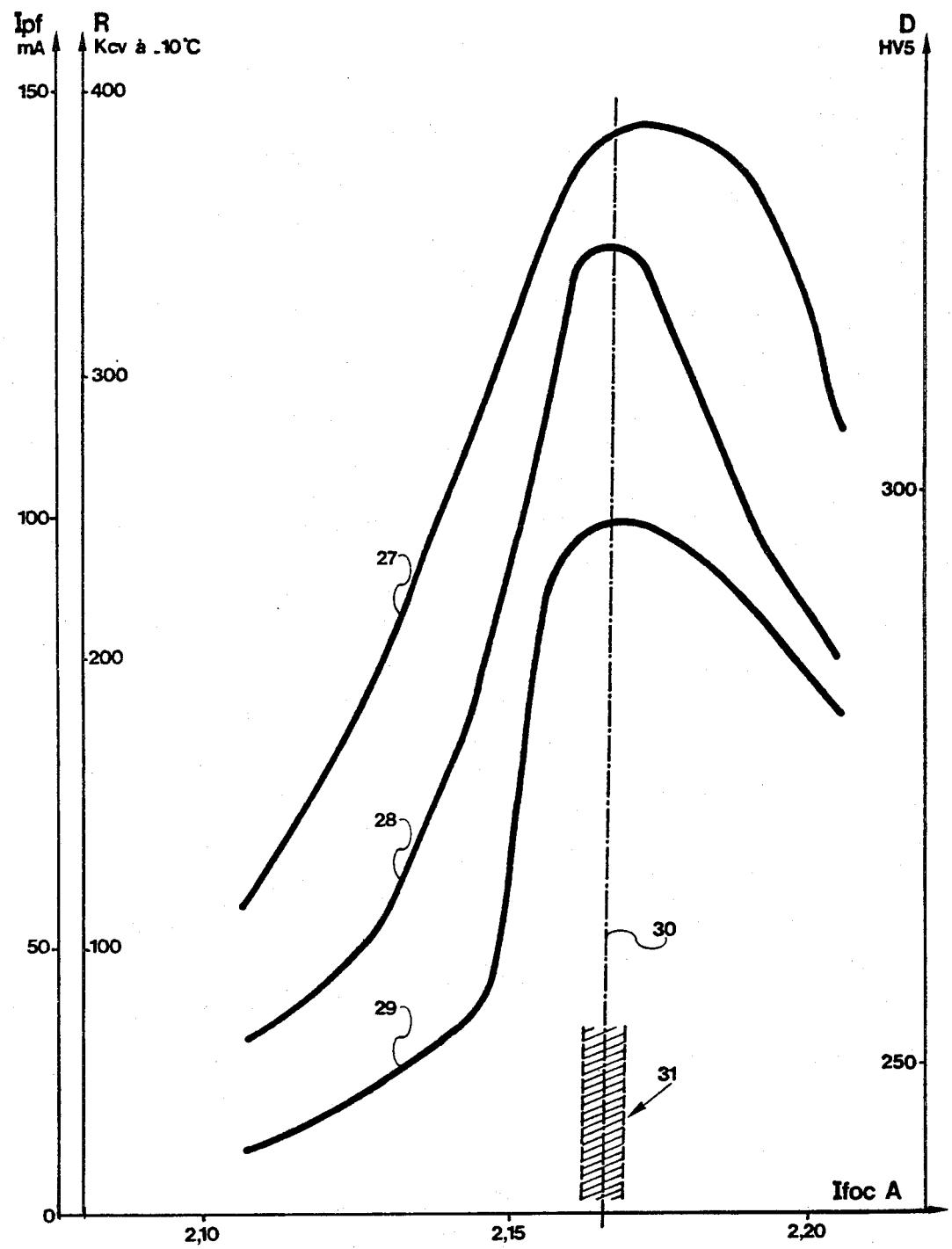
FIG. 4 is a graph summarising the results obtained by using a process according to the invention with metal having a chemical composition as set out above.

FIG. 4 is a graph on which the result obtained by applying a process according to the invention to metal having the chemical composition set out above has been plotted.

The curve 27 is that of the current designated by $I_{fire\ shield}$, this value being used to illustrate the variations in $P_{tr}$ as a function of those in $I_{foc}$. This current is given in milliamperes.

The curve 28 gives the variations in the hardness of the metal in HV5 values.

The curve 29 is that of the resilience expressed in Kcv units at −10° C.

This therefore shows very clearly that, for a value of $I_{foc}$ represented by the ordinate 30 and equal to about 2.165 A, the hardness and the resilience have values which are very close to the maximum values, and this clearly demonstrates the advantage of using a process according to the invention.

A narrow zone on either side of the value 30 of $I_{foc}$ has also been shown at 31, within which operating zone the values of the hardness and the resilience are still workable.

It is understood that the present invention is not to be limited to the embodiments which have now been described, but can also form the subject of modifications of detail without thereby going outside the framework of the invention or exceeding its scope.

Thus, in order to refine the regulation of the process further, account can also be taken of the powers $P_b$, $P_{th}$ and $P_s$. For this purpose, the corresponding intensities are measured by interposing, on the path of the electron beam, a first electrode 50 which possesses an opening at its center and is located upstream of the pieces to be welded, and a second electrode 51 which also possesses a central opening and is located downstream of the said pieces. These two electrodes are electrically connected to one another and also to the fire shield 41. Measurement of the intensity passing through the collection resistor then gives the following sum directly:

$$I_b + I_s + I_{th} + I_{tr}$$

For the same purpose, it is also possible to interpose, between the pieces to be welded on the one hand and the collector on the other hand, a screen which is connected to ground and which possesses a central opening of the passage of the transmitted electron beam.

Furthermore, it is clear that, in another modified embodiment of the device for carrying out the invention, as described above and as shown in FIG. 3, the voltage 5 can be fed directly into the input of the comparator 11 which is also fed with the required value 12 of this same voltage, without involving the subtractor means 6 or the multiplier means 8.

Other modified embodiments can also be envisioned. Thus, for example, it is possible to collect the voltage proportional to the intensity of the electron beam passing through the pieces to be welded, which voltage is collected at the terminals of a resistor which ground a collector consisting of a fire shield 41 located behind the said pieces, this voltage being fed directly into a comparator which is also fed with the predetermined specified value of this voltage, the subsequent treatment of the signal thus obtained remaining unchanged.

It is also possible to improve the precision of the results obtained, by surrounding the fire shield 41 with a Faraday cage 46 which is electrically connected to the said shield and possesses an orifice for the passage of the electron beam passing through the pieces to be welded.

It is also possible to interpose, immediately behind the pieces to be welded, a screen which possesses an orifice for the passage of the beam and is electrically connected to earth, or also to interpose a screen of this type in front of the pieces to be welded and to connect it electrically to the fire shield 41.

What is claimed is:

1. A process for regulating an electron beam welding of pieces, comprising the steps of: measuring the power of the electron beam emitted from an electron gun;
    measuring the power passing through said pieces to be welded;
    substracting said measured power passing through said pieces from said measured power of said gun electron beam;
    comparing said difference to a preset constant value obtained from previous tests for getting good mechanical and metallurgical characteristics of the weld; and
    utilizing a signal resulting from this comparison for adjusting a focusing of said electron beam so as to produce a weld having said good mechanical and metallurgical characteristics.

2. The process according to claim 1, wherein said signal is utilized for adjusting said focusing after its passage through a limiting device.

3. A process according to claim 2, wherein said measurement of the power of the electrons which have passed through the pieces to be welded is carried out by measuring the voltage collected at the terminals of a resistor which is connected between ground and a collector intersecting the electrons which have passed through the pieces to be welded.

4. A process according to claim 3, wherein said collector comprises a fire shield which is located on the side of the pieces to be welded which is opposite the side on which the electron beam is incident.

5. A process according to claim 4, wherein said fire shield is surrounded by a Faraday cage which is provided with an opening for the passage of the electrons which have passed through the pieces to be welded.

6. The process according to claims 1 or 2, further comprising the steps of: passing said signal prior to its utilization for adjusting said focusing into a memory device which retains a value of said signal during a fading phase and an establishment phase of said electron beam; and
    monitoring said signal with a program system.

7. The process according to claim 1 further comprising the steps of measuring a power of back-scattered electrons, secondary electrons and electrons of thermal origin and substracting these measured powers from said measured power of said gun electron beam.

* * * * *